United States Patent
Hastrup

(10) Patent No.: US 10,494,190 B2
(45) Date of Patent: Dec. 3, 2019

(54) CONVEYOR PULLEY, PROCESS FOR PRODUCING A ROLLER TUBE AND DEFORMING TOOL

(71) Applicant: Interroll Holding AG, Sant' Antonino (CH)

(72) Inventor: Niels Hastrup, Frederiksberg (DK)

(73) Assignee: INTEROLL HOLDING AG (DE)

( * ) Notice: Subject to any disclaimer, the term of this patent is extended or adjusted under 35 U.S.C. 154(b) by 0 days.

(21) Appl. No.: 15/764,428

(22) PCT Filed: Sep. 1, 2016

(86) PCT No.: PCT/EP2016/001481
§ 371 (c)(1),
(2) Date: Mar. 29, 2018

(87) PCT Pub. No.: WO2017/054899
PCT Pub. Date: Apr. 6, 2017

(65) Prior Publication Data
US 2018/0282073 A1    Oct. 4, 2018

(30) Foreign Application Priority Data
Sep. 30, 2015 (DE) .......... 10 2015 012 665

(51) Int. Cl.
| B65G 39/00 | (2006.01) |
| B65G 39/10 | (2006.01) |
| B65G 39/07 | (2006.01) |
| B65G 39/02 | (2006.01) |
| B65G 39/071 | (2006.01) |
| B21D 22/10 | (2006.01) |

(Continued)

(52) U.S. Cl.
CPC .......... *B65G 39/02* (2013.01); *B21D 22/105* (2013.01); *B21D 39/206* (2013.01); *B65G 39/071* (2013.01); *B65G 39/073* (2013.01)

(58) Field of Classification Search
None
See application file for complete search history.

(56) References Cited

U.S. PATENT DOCUMENTS

| 3,986,383 A | 10/1976 | Petteys |
| 4,418,556 A | 12/1983 | Galle et al. |

(Continued)

FOREIGN PATENT DOCUMENTS

| CA | 432397 | 1/1946 |
| DE | 1014931 | 8/1957 |

(Continued)

OTHER PUBLICATIONS

International Search Report dated Feb. 27, 2017.

*Primary Examiner* — Kavel Singh
(74) *Attorney, Agent, or Firm* — Gerald E. Hespos; Michael J. Porco; Matthew T. Hespos

(57) ABSTRACT

According to the present invention, a conveyor pulley for use in a belt conveyor is provided, comprising:
a roller tube (1);
wherein the roller tube (1) is formed by plastically deforming a central portion of a substantially cylindrical metal tube (2) radially outwardly so as to form a crowned portion (4) having an enlarged outer diameter ($OD_{ENL}$) with respect to remaining portions (6) of the metal tube (2).

4 Claims, 6 Drawing Sheets

(51) Int. Cl.
 *B21D 39/20* (2006.01)
 *B65G 39/073* (2006.01)

(56) References Cited

U.S. PATENT DOCUMENTS

| | | | |
|---|---|---|---|
| 8,579,774 B2 * | 11/2013 | Derscheid | A01F 15/18 |
| | | | 198/835 |
| 2003/0140673 A1 | 7/2003 | Marr et al. | |
| 2007/0204666 A1 | 9/2007 | Suzuki et al. | |
| 2008/0178650 A1 | 7/2008 | Tomizawa et al. | |
| 2012/0152701 A1 * | 6/2012 | Kern | B65G 39/09 |
| | | | 198/842 |

FOREIGN PATENT DOCUMENTS

| | | |
|---|---|---|
| DE | 202012104513 | 1/2013 |
| DE | 102013105481 | 12/2014 |
| GB | 2074914 | 11/1981 |

* cited by examiner

CONVEYOR PULLEY, PROCESS FOR PRODUCING A ROLLER TUBE AND DEFORMING TOOL

BACKGROUND

Field of the Invention

The present invention relates to a conveyor pulley for use in a belt conveyor, a process for producing a roller tube of a conveyor pulley, and a deforming tool for forming a crowned portion of a roller tube.

Description of the Related Art

Typically, a belt conveyor includes two spaced apart pulleys or rollers that are mounted rotatably to a frame. A conveyor belt is entrained around the pulley and provides a conveying surface to move objects from an inlet end of the conveyor to a discharge end. Some form of motor drive is connected to one of the pulleys, usually referred to as the drive pulley. The input torque is transmitted by friction from the drive pulley to the conveyor belt causing the conveyor belt to move along a continuous path.

A common problem associated with many belt conveyors is the tendency of the conveyor belt to drift sideways. If the conveyor belt drifts too far to one side, the belt may rub against the frame of the conveyor causing excessive wear and greatly decreasing the life of the conveyor belt. Additionally, the friction caused by the belt rubbing against the conveyor frame increases the load on the drive motor and increases the horsepower consumption.

Crowned pulleys or rollers are commonly used to keep the conveyor belt tracking properly and from drifting sideways. Crowned pulleys generally come in different configurations: tapered crowns, trapezoidal crowns and convex crowns. In pulleys with crowns, the surface of the pulley tapers upwardly from each side towards the center of the pulley, e.g. it tapers upwardly from each end towards the center of the pulley or it tapers upwardly from ⅓ of the length towards the center of the pulley. The tapered surfaces meet at the center of the pulley to form an apex. In pulleys having trapezoidal crowns, the surface of the pulley tapers upwardly from each end of the pulley to a flat (when viewed in cross-section) center portion. In either case, the center diameter of the drive pulley is generally one to two percent greater in diameter than the ends of the pulley. The difference in diameter is sufficient to cause the belt to constantly correct itself to maintain its central position on the drive pulley.

Crowned pulleys currently in use are produced from heavy metal wall tubing. The outside surface of the tubing is machined to provide the desired crown profile. The machining process is relatively expensive and a substantial portion of the machine tube material ends up as unusable chips resulting in an expensive material loss.

Accordingly, it is an object of the present invention to provide a crowned conveyor pulley which can be produced in an inexpensive manner without material loss, as well as a production method and a deforming tool therefor.

SUMMARY

According to an aspect of the present invention, there is provided a conveyor pulley for use in a belt conveyor, comprising a roller tube. The roller tube is formed by plastically deforming a central portion of a substantially cylindrical metal tube radially outward so as to form a crowned portion having an enlarged outer diameter with respect to remaining portions of the metal tube.

Advantageously, the conveyor pulley can be produced without expensive machining or material loss. Additionally, the noise emission of the running belt conveyor is reduced and the friction between the belt and the crowned pulley is improved caused by an enlarged contact surface of the cold drawn metal tube.

The conveyor pulley may further comprise bearings, brakes and/or drive mechanisms disposed within the roller tube. The conveyor pulley may further comprise mounting structures for mounting the conveyor pulley to a frame of the belt conveyor. The roller tube or metal tube may have an axial length of about 150 mm to about 2000 mm, for example. The crowned portion is provided at an axial central portion of the roller tube or metal tube can have an axial length of about 10% to about 80% of the axial length of the roller tube or metal tube. The outer diameter of the roller tube or the metal tube at portions other than the crowned portion may be about 50 mm to about 500 mm, wherein typical outer diameters are about 80 mm or about 113 mm. The metal tube may be formed of steel. The "remaining portions of the metal tube" is to be understood as portions other than the crowned portion, i.e. portions of the substantially cylindrical metal tube that have not been plastically deformed or otherwise worked on to change the outer and/or inner diameter thereof.

The crowned portion of the roller tube or metal tube is formed by plastic deformation, and a deforming tool as described below can be used for the deformation. The crowned portion has an enlarged outer diameter as compared to remaining portions of the metal tube that have not been deformed. The crowned portion can have a tapered form in which the outer surface of the roller tube or metal tube tapers upwardly from each lateral end of the crowned portion towards the center of the roller tube or metal tube in a cross-sectional view, e.g. tapering upwardly from each end towards the center of the pulley or tapering upwardly from about ⅓ of the length towards the center of the pulley. The tapered surfaces may meet at the center of the roller tube or metal tube to form an apex. The crowned portion can also have a trapezoidal form or stepped form, wherein the center portion of the outer surface of the crowned portion is flat in a cross-sectional view, i.e. the center portion of the crowned portion is substantially cylindrical. In the trapezoidal configuration, the outer surface of the roller tube or metal tube tapers up from each lateral side or end of the crowned portion towards the flat portion, whereas in the stepped configuration, the transition at each lateral end of the crowned portion is stepped.

The material thickness of the metal tube at the crowned portion may be substantially equal to the material thickness of the metal tube at the remaining portions.

The substantially cylindrical metal tube may have a constant material thickness of about 1 mm to about 3 mm, preferably about 2 mm, along the axial length of the metal tube prior to the forming of the crowned portion. However, even after the forming of the crowned portion, the material thickness of the metal tube at the crowned portion is substantially equal to the material thickness of the metal tube at the remaining portions. This is because the reduction in the material thickness due to the stretching of the material during the plastic deformation of the material is rather small. Thus, the roller tube or metal tube may have a substantially constant material thickness of about 1 mm to about 3 mm, preferably about 2 mm, along the axial length of the roller tube or metal tube including the crowned portion.

The outer diameter of the crowned portion may be about 0.5% to about 3%, preferably about 1% to about 2% larger than the outer diameter of the remaining portions of the metal tube.

The "outer diameter of the crowned portion" is to be understood as the largest outer diameter of the crowned portion, which is typically located at the axial center of the crowned portion.

The crowned portion may be substantially cylindrical and a tapered portion, stepped portion or smooth gradual transition portion may be formed between the crowned portion and the remaining portions of the metal tube.

The conveyor pulley may further comprise mounting structures for mounting the conveyor pulley to a frame of the belt conveyor.

According to another aspect of the present invention, a process for producing a roller tube of a conveyor pulley for use in a belt conveyor is provided, comprising the steps of: providing a substantially cylindrical metal tube; inserting a deforming tool into the metal tube, the deforming tool having a radially outwardly expandable deforming portion; radially outwardly expanding the deforming portion such that a central portion of the metal tube is plastically deformed radially out so as to form a crowned portion having an enlarged outer diameter with respect to the remaining portions of the metal tube.

The indications made above in connection with the conveyor pulley apply respectively to the process described herein.

The deforming tool used in the process may be one of the deforming tools as described further below. The process may further comprise a step of inserting the substantially cylindrical metal tube into an outer forming tool before radially outwardly expanding the deforming portion. The outer forming tool may have an inner contour corresponding to the desired outer contour of the roller tube having the crowned portion.

The step of expanding the deforming portion may comprise radially outwardly displacing three rolls having rotational axes substantially parallel to the longitudinal axis of the metal tube, and rotating the three rolls about the longitudinal axis of the metal tube.

The deforming process using the three rolls can also be referred to as "rolling" of the crowned portion. The three rolls may be radially outwardly displaced at equally distanced locations from each other within a plane perpendicular to the axial direction of the metal tube. The outer diameter of each of the rolls can be about 15% to about 30% of the inner diameter of the metal tube, for example. The rolls may have an axial length of about 10 mm, and the outer surface of the rolls may be rounded or crowned. For forming the crowned portion of the metal tube, the rolls may be moved along the longitudinal axis of the metal tube while the metal tube and/or the tool is being rotated about the longitudinal axis of the metal tube. This movement can be a reciprocating movement within the central portion of the metal tube.

The process step of expanding the deforming portion may comprise axially compressing a rubber block such that an outer diameter of the rubber block is expanded.

The rubber block may have a cross-sectional shape, at least in an axial center thereof, matching the inner cross-sectional shape of the metal tube. The surface of the rubber block may be rounded or crowned, such that the rubber block may be substantially barrel shaped. The axial length of the rubber block may substantially correspond to the axial length of the crowned portion of the metal tube to be formed.

The process step of expanding the deforming portion may comprise radially outwardly expanding an expanding mandrel by displacing a tapered expanding bolt within the expanding mandrel.

The expanding mandrel may be slotted and made of a metal such as steel. The axial length of the expanding mandrel may substantially correspond to the axial length of the crowned portion of the metal tube to be formed.

The process step of expanding the deforming portion may comprise axially compressing an expanding hydraulic fluid such as water or oil.

The embodiments of the deforming tool will be described in more detail below.

According to another aspect of the present invention, a deforming tool for forming a crowned portion of a roller tube of a conveyor pulley for use in a belt conveyor is provided. The deforming tool may include an actuator; a shaft; and a radially outwardly expandable deforming portion arranged at an end of the shaft. The deforming tool is capable of being inserted into a substantially cylindrical metal tube and capable of plastically deforming a central portion of the metal tube radially out by radially outwardly expanding the deforming portion.

The indications made above in connection with the conveyor pulley and the production process apply respectively to the deforming tool described herein.

The shaft may be made of metal, such as steel, and has the function of arranging the deforming portion in the axial central portion of the metal tube. In one embodiment, only the deforming portion and the shaft of the deforming tool are at least partly inserted into the metal tube. Driving power generated in the actuator may be transmitted to the deforming portion via the shaft. The actuator can comprise an electric actuator, a hydraulic actuator and/or a pneumatic actuator for radially outwardly expanding the deforming portion. The deforming tool may be mounted on a frame or base.

The deforming tool may be combined with an outer forming tool having an inner contour corresponding to the desired outer contour of the roller tube having the crowned portion. The outer forming tool may be understood as part of the deforming tool. The substantially cylindrical metal tube can be inserted into the outer forming tool at least before expanding the deforming portion. Thus, the radially outward deformation of the metal tube can be restricted in a desired manner, so as to obtain a desired final shape of the roller tube. The outer forming tool can be made of two or more parts that can be displaced with respect to each other, thereby enabling easy insertion and removal of the metal tube into and from the outer forming tool. Although the crowned portion can be formed without the use of the outer forming tool, the outer forming tool simplifies the production of the roller tube by reducing the burden for precisely controlling the operation of the deforming portion, while enabling precise formation of the outer contour of the crowned portion in a desired manner.

The deforming portion may comprise three arms hingedly connected to the shaft and axially extending forward from a front axial end of the shaft in an initial state. Each of the arms may comprise a roll arranged at front ends thereof. Rotational axes of the rolls may be substantially parallel to a longitudinal axis of the shaft in the initial state. The actuator may be configured to displace the front ends of the arms radially out from the initial state.

The three arms may be arranged equally distanced from each other along an outer circumference portion of the shaft. The rotational axes of the arms may be perpendicular to and distanced from the longitudinal center axis of the shaft. The actuator may be configured to evenly displace the front ends of the arms radially out. The initial state refers to a state wherein the arms are not radially outwardly displaced.

The deforming tool may further comprise an actuating rod arranged in an axial bore extending through the shaft. A front end portion of the actuating rod may be tapered such that the diameter thereof decreases toward a front end or the actuating rod. Each arm may comprise a displacing roll rotatably mounted to the respective arm, and a rotational axis of each displacing roll may be perpendicular to a swinging plane of the respective arm. The actuator may be configured to push the actuating rod forward so that running surfaces of the displacing rolls come into contact with a surface of the tapered front end portion of the actuating rod. Thus, the tapered front end portion transmits force via the displacing rolls to the arms to displace the arms radially outwardly.

The deforming tool may further comprise a moving device capable of moving the deforming portion along the longitudinal axis of the shaft and rotating the deforming portion about the longitudinal axis of the shaft.

The moving device may be fixed to the shaft and/or the deforming portion and may move the deforming portion such that the rolls can contact and deform the metal tube along the entire central portion of the metal tube evenly so as to form the crowned portion.

The deforming portion may comprise a rubber block whose outer diameter is expandable by axially compressing the rubber block. The deforming portion may further comprise two pressing plates arranged at both axial ends of the rubber block. The actuator may be configured to axially compress the rubber block by displacing the two pressing plates toward each other.

The deforming tool may comprise a second shaft, with the pressing plates being arranged at the axial ends of the shaft and the second shaft, respectively. The shafts can be displaced towards each other by the actuator to displace the two pressing plates toward each other. The shaft and the second shaft are insertable into the metal tube from opposite ends thereof. Alternatively, one of the pressing plates may be arranged at the axial end of the shaft, and the actuator may comprise a rod or bar extending through the shaft. The one pressing plate and the rubber block may be connected fixedlynnected to the other pressing plate. The rod or bar can be retracted by the actuator to displace the two pressing plates toward each other.

The deforming portion may comprise a slotted expanding mandrel whose outer diameter is expandable by displacing a tapered expanding bolt within the expanding mandrel. The actuator portion may be configured to displace the tapered expanding bolt within the expanding mandrel.

The inner surfaces of the slotted expanding mandrel may also be tapered so that the tapered inner surfaces of the expanding mandrel and the tapered outer surface of the expanding bolt can come into sliding contact with each other. The deforming portion may comprise two tapered expanding bolts having reverse tapering directions. The two expanding bolts may be displaced toward each other by the actuator. Similar to the above described alternative configurations for displacing the two pressing plates to compress the rubber block, the two expanding bolts may also be arranged at the axial ends of two separate shafts that are moved toward each other. Alternatively, a rod or bar may extend through the shaft. The proximal expanding bolt and the expanding mandrel may be connected fixedly to the distal expanding bolt. Thus, the rod or bar can be retracted by the actuator to displace the expanding bolts toward each other.

The deforming portion may comprise two sealing plates capable of defining a fluid-tight space within the metal tube. The space may be filled with an expanding fluid such as water or oil. The actuator may be configured to displace the two sealing plates toward each other so as to radially outwardly displace the expanding fluid.

Similar to the above described alternative configurations for displacing the two pressing plates to compress the rubber block, the two sealing plates may also be arranged at the axial ends of two separate shafts that are moved toward each other. Alternatively, a rod or bar may extend through the shaft, and the proximal sealing plate and the fluid-tight space filled with the expanding fluid may be connected fixedly to the distal sealing plate. The rod or bar can be retracted by the actuator to displace the sealing plates toward each other. In addition, the deforming tool may comprise a fluid-channel extending through the shaft and at least one of the sealing plates for filling and/or draining the expanding fluid into or from the fluid-tight space. The fluid-channel may be connected to a fluid-tank for containing the expanding fluid. It is noted that the term "expanding fluid" is aimed to indicate that the fluid is used for expanding the crowned portion of the metal tube radially out by being displaced radially out, but not to indicate that the expanding fluid per se is expanding in volume.

In the following, embodiments of the present invention will be described with reference to the accompanying drawings. It is to be understood that the present invention is in no way limited to the embodiments described hereafter, and that isolated features from the embodiments can be freely combined to obtain further embodiments of the present invention within the scope of the claims.

DETAILED DESCRIPTION

Figure 1:
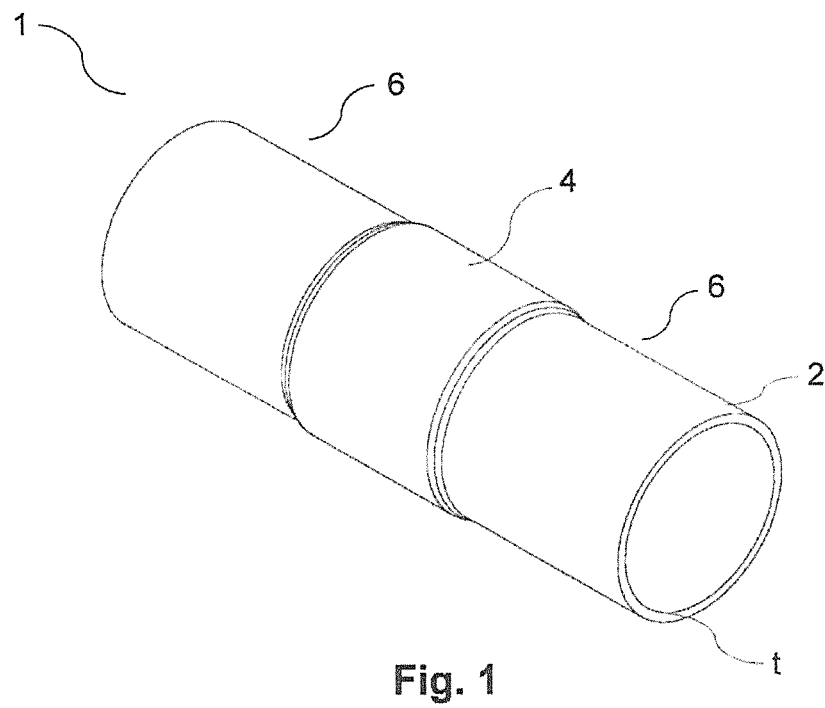
FIG. 1 shows a perspective view of a roller tube according to an embodiment.
Figure 2:
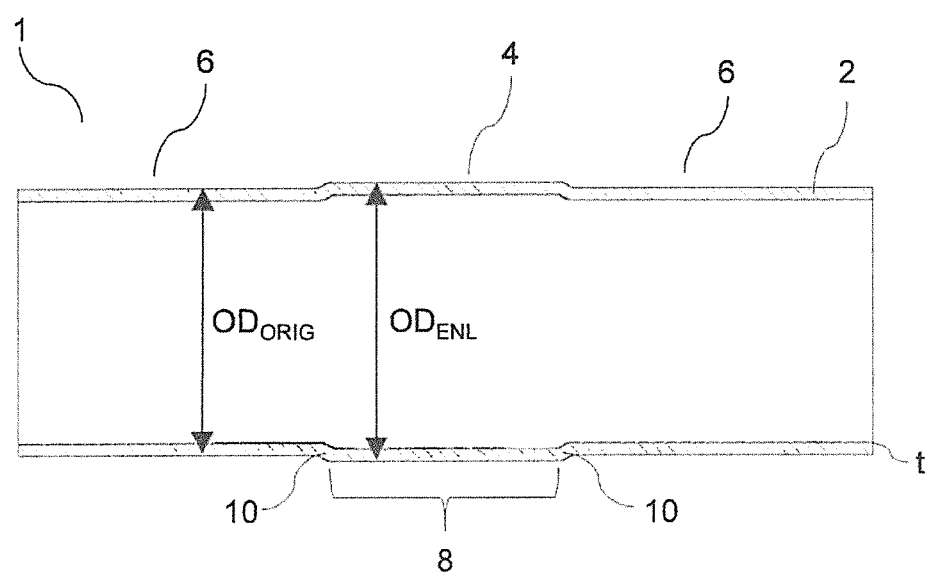
FIG. 2 shows a cross-sectional view of the roller tube of FIG. 1.

FIG. 1 shows a perspective view of a roller tube 1 according to an embodiment, and FIG. 2 shows a cross-sectional view of the roller tube 1 of FIG. 1. Further components, such as bearings, brakes and/or drive mechanisms (not shown) may be mounted in the roller tube 1 to form a conveyor pulley according to an embodiment. The conveyor pulley may further comprise mounting structures (not shown) for mounting the conveyor pulley to a frame of the belt conveyor.

The roller tube 1 is formed of a metal tube 2 that is substantially cylindrical prior to the forming of the crowned portion 4 by plastic deformation. The remaining portions 6 of the roller tube 1 that are not plastically deformed remain substantially cylindrical and maintain the original outer diameter of the metal tube 2. The crowned portion 4 is arranged in a central portion of the metal tube 2 in the axial direction and comprises a substantially cylindrical or flat portion 8 and tapered portions 10 forming the transitions between the cylindrical portion 8 and the remaining portions 6 at both axial ends of the cylindrical portion 8. The crowned portion 4, particularly the cylindrical portion 8 thereof, has an enlarged outer diameter $OD_{ENL}$ as compared to the outer diameter $OD_{ORIG}$ of the remaining portions 6, wherein $OD_{ORIG}$ is also the original outer diameter of the original metal tube 2 prior to the forming of the crowned portion 4. For example, the remaining portions 6 can have an outer diameter $OD_{ORIG}$ of about 80 mm, whereas the crowned portion 4 can have an outer diameter $OD_{ENL}$ of about 81.5 mm. According to a different example, the remaining portions 6 can have an outer diameter $OD_{ORIG}$ of about 113 mm, whereas the crowned portion 4 can have an outer diameter $OD_{ENL}$ of about 114.5 mm.

It is noted that the material thickness t of the steel material of the metal tube 2 is substantially constant along the axial length of the roller tube 1. Therefore, the crowned portion 4, particularly the cylindrical portion 8 thereof, also has an enlarged inner diameter as compared to the inner diameter of the remaining portions 6, which is also the original inner diameter of the original metal tube 2 prior to the forming of the crowned portion 4.

Figure 3:
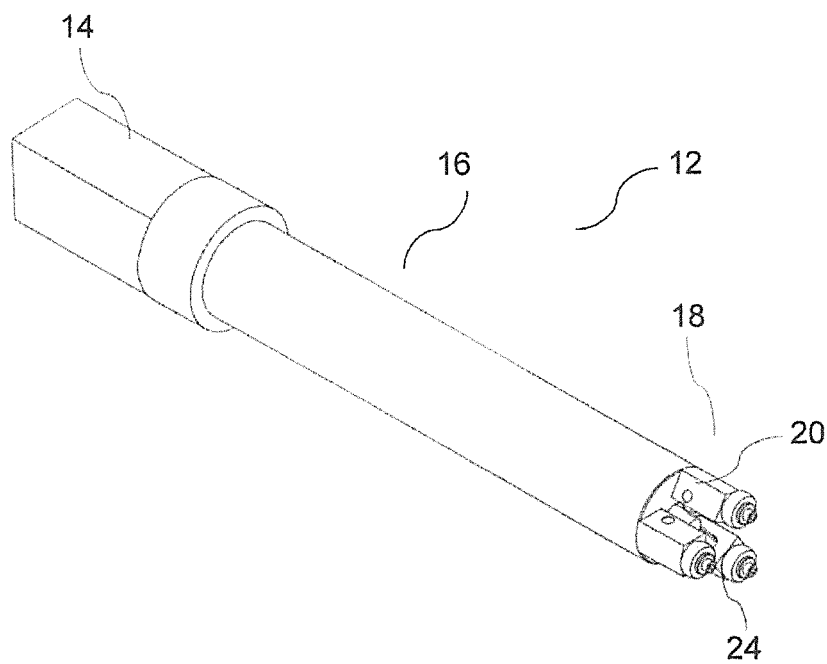
FIG. 3 shows a perspective view of a deforming tool according to a first embodiment.
Figure 4:
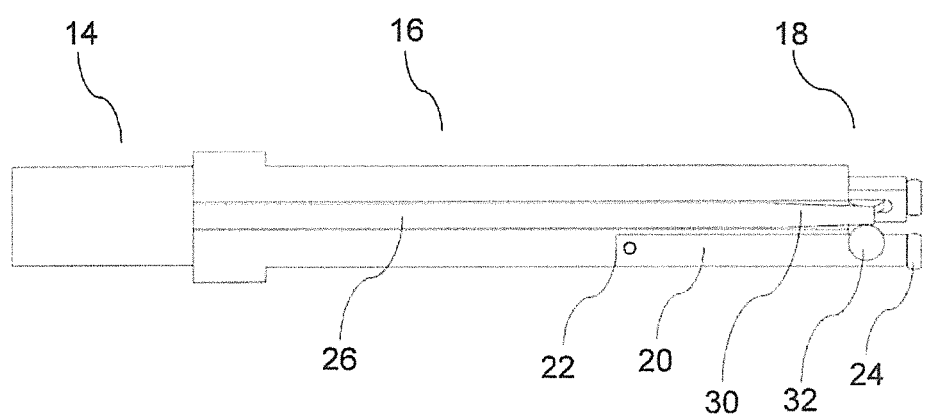
FIG. 4 shows a cross-sectional view of the deforming tool of FIG. 3.

FIG. 3 shows a perspective view of a deforming tool 12 according to a first embodiment, and FIG. 4 shows a cross-sectional view of the deforming tool 12 of FIG. 3, wherein the cut is made along the central longitudinal axis of the deforming tool 12. The deforming tool 12 according to the first embodiment comprises an actuator 14, a shaft 16 and a radially outwardly expandable deforming portion 18 arranged at an end of the shaft 16. The deforming portion 18 comprises three arms 20 hingedly connected to the front end of the shaft 16 and evenly spaced along the circumference of the end of the shaft 16. The front end or distal end of the deforming tool 12 refers to the end of the deforming tool 12 with which the deforming tool 12 is inserted into the metal tube. The hinged connections allow the distal ends of the arms 20 to hingedly displace radially out. FIGS. 3 and 4 show the deforming tool 12 in the initial state, where the arms 20 are not displaced radially out. In the initial state, the arms 20 are fit snugly in slots 22 (not shown in FIG. 3) formed at the end of the shaft 16 so that the distal front end portions of the arms 20 protrude from the front end of the shaft 16. The arms 20 are connected hingedly to the shaft at the back ends of the arms 20. At each of the front faces of the arms 20, a roll 24 is mounted rotatably. The rotational axis of each roll 24 coincides with or is parallel to the longitudinal axis of the respective arm 20. The rotational axis of each roll 24 is also parallel to the longitudinal axis of the deforming tool 12 or the shaft 16 thereof in the initial state. The rolls 24 are the parts of the deforming tool 12 that come into contact with the metal tube to plastically deform the metal tube.

As shown in FIG. 4, the deforming tool 12 comprises an actuating rod 26 connected to a piston rod (not shown) of the actuator 14. The actuating rod 26 is arranged in an axial bore extending through the center of the shaft 16. In other words, the actuating rod 26 extends through the shaft 16. A front end portion 30 of the actuating rod 26 is tapered such that the diameter thereof decreases towards the front end. In the initial state, i.e. when the piston rod and the actuating rod 26 are not pushed forward but are retracted, the front end portion 30 of the actuating rod 26 does not protrude or only partly protrudes from the front end of the shaft 16. In order to displace the arms 20 radially out, the piston rod is pushed hydraulically forward to push the actuating rod 26 forward while the actuating rod 26 is being guided by the axial bore of the shaft 16. Each arm 20 comprises a displacing roll 32 rotatably mounted to the respective arm 20. The rotational axis of each displacing roll 32 is perpendicular to the longitudinal axis of the respective arm 20 and also perpendicular to the swinging direction or plane of the respective arm 20. In other words, the rotational axis of each displacing roll 32 is parallel to the rotational axis of the hingedly arranged arm 20, respectively. The displacing rolls 32 are arranged such that the running surfaces of the displacing rolls 32 come into contact with the surface of the tapered front end portion 30 of the actuating rod 26 when the actuating rod 26 is pushed and displaced forward to gradually protrude forward from the front end of the shaft 16. When displaced forward, the tapered front end portion 30 transmits force via the displacing rolls 32 to the arms 20 and gradually pushes the arms 20 radially outwardly.

Figure 5:
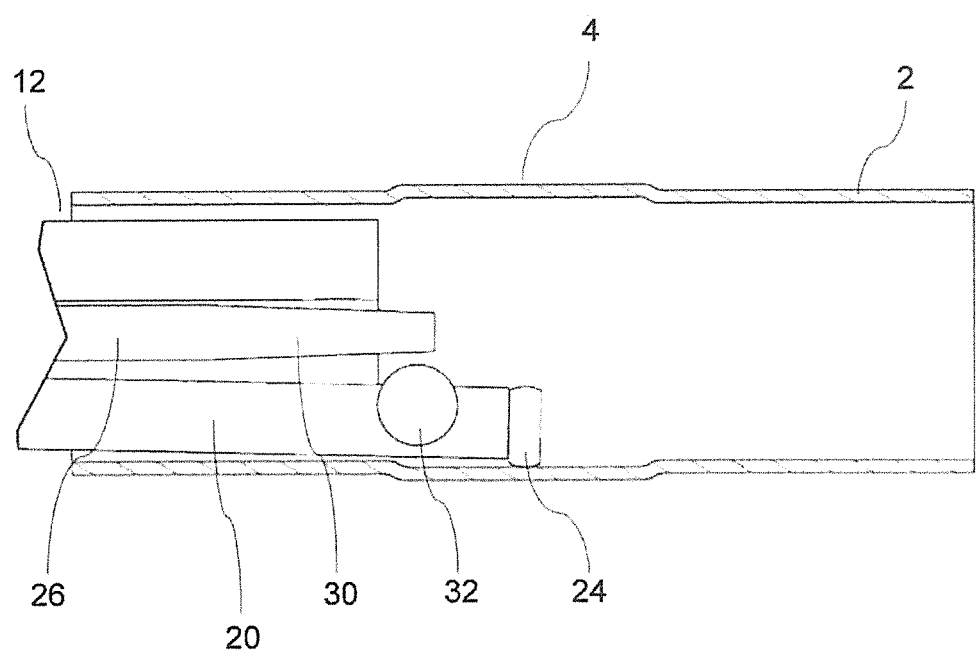
FIG. 5 shows a cross-sectional view of the deforming tool of FIG. 3 during use.

FIG. 5 is a cross-sectional view of the deforming tool 12 of FIG. 3. The deforming tool 12 is inserted into the metal tube 2 with its front end to form the crowned portion 4 in the central portion of the metal tube 2. In the state shown in FIG. 5, the crowned portion 4 has already been formed by the rolls 24 of the arms 20. When the three arms 20 are spread apart by the actuating rod 26, each roll 24 of the respective arms 20 comes into contact with the inner wall of the metal tube 2 and plastically deforms the metal tube 2 radially outward. Good centering of the deforming tool 12 and/or the metal tube 2 is provided due to the three-point contact. In order to form the crowned portion 4, the deforming tool 12 and/or the metal tube 2 is rotated about the longitudinal axis of the deforming tool 12 and the deforming tool 12 and/or the metal tube 2 is moved along the longitudinal axis of the deforming tool 12 or metal tube 2 by means of a moving device (not shown).

Figure 6A:
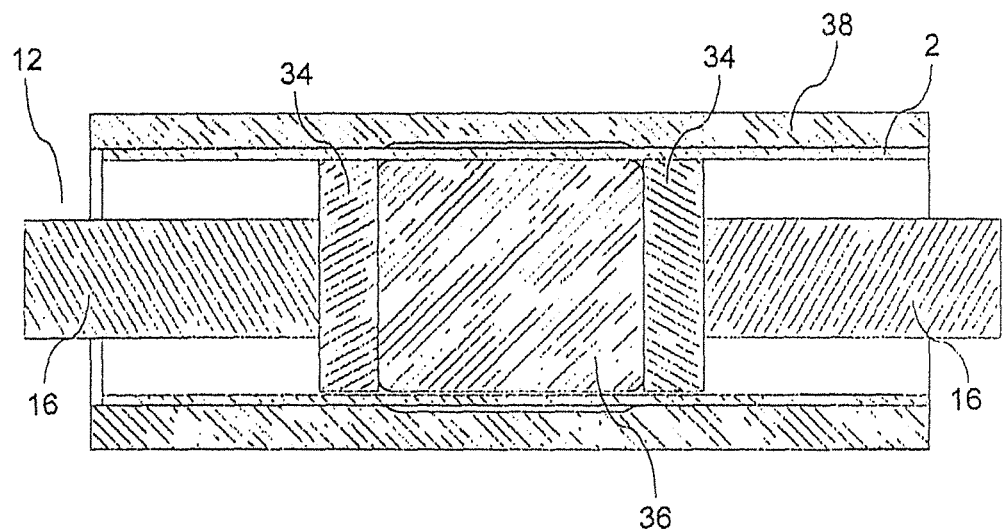
FIGS. 6(a) and 6(b) show cross-sectional views of a deforming tool according to a second embodiment during use.
Figure 6B:
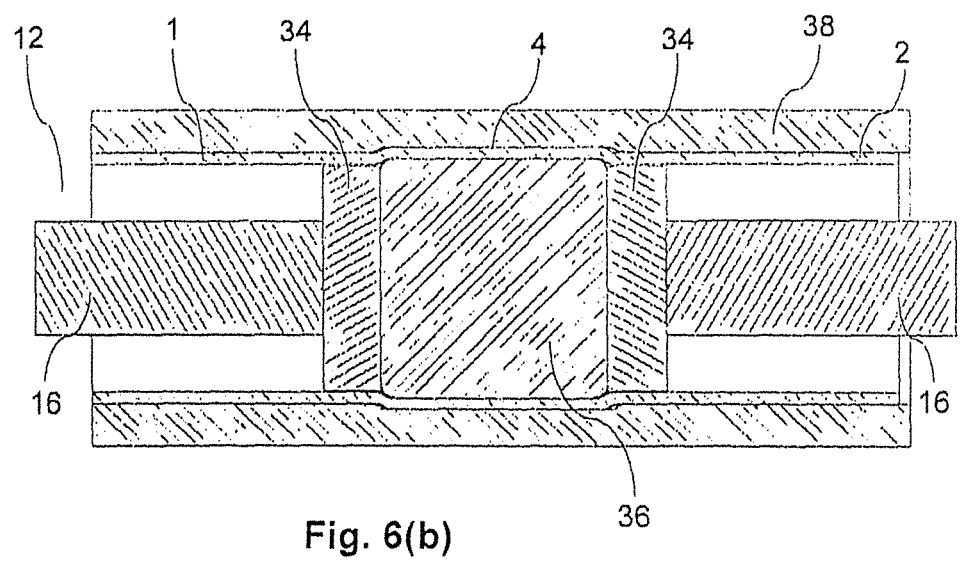

FIGS. 6(a) and 6(b) show cross-sectional views of a deforming tool 12 according to a second embodiment, once in a state before forming the crowned portion 4 (FIG. 6(a)) and once in a state after forming the crowned portion 4 (FIG. 6(b)). The deforming tool 12 comprises two shafts 16 each having a pressing plate 34 arranged at the front end thereof. The pressing plates 34 sandwich a rubber block 36 having a cylindrical outer contour corresponding to the inner contour of the metal tube 2 before the forming of the crowned portion 4. The pressing plates 34 and the rubber block 36 form the deforming portion of the deforming tool 12. The shafts 16 and the pressing plates 34 can be displaced toward each other by means of a single actuator (not shown) or actuators provided for each shaft 16, respectively.

By displacing the pressing plates 34 toward each other, the rubber block 36 is compressed in the axial direction and thereby expands in the radial direction, so that the outer circumferential surface of the rubber block 36 presses against the inner surface of the metal tube 2 and deforms the metal tube 2 from the inside radially outwardly. Thereby, the crowned portion 4 is formed. The axial length of the rubber block 36 before compression substantially corresponds to the axial length of the crowned portion 4 to be formed. The deforming tool 12 comprises an outer forming tool 38 into which the metal tube 2 is placed or inserted prior to the forming of the crowned portion 4. The inner contour of the outer forming tool 38 substantially corresponds to the desired outer contour of the roller tube 1 having the crowned portion 4. That is, the central portion of the outer forming tool 38 has a cylindrically formed inner surface having an enlarged inner diameter as compared to the cylindrically formed inner surface of the remaining portions of the outer forming tool 38. The enlarged inner diameter of the central portion of the outer forming tool 38 substantially corresponds to the enlarged outer diameter $OD_{ENL}$ of the crowned portion 4 of the roller tube 1. Due to the outer forming tool 38, the metal tube 2 is allowed to be deformed radially out at the center portion of the metal tube 2 and the outer forming tool 38, whereas the metal tube 2 is prevented from being deformed at the remaining portions of the metal tube 2 and the outer forming tool 38. Thus, the outer contour of the finished roller tube 1 can be controlled precisely in a simple manner.

Figure 7A:
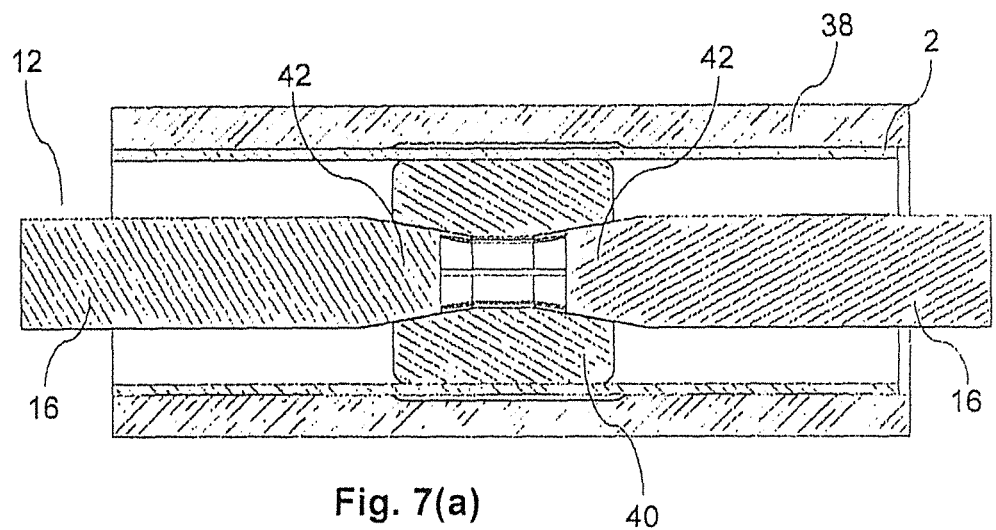
FIGS. 7(a) and 7(b) show cross-sectional views of a deforming tool according to a third embodiment during use.
Figure 7B:
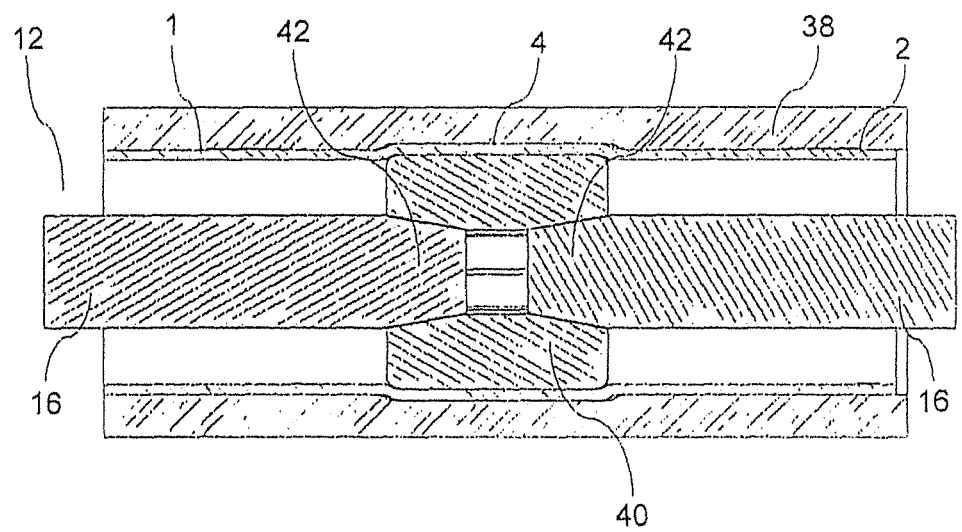

FIGS. 7(*a*) and 7(*b*) show cross-sectional views of a deforming tool 12 according to a third embodiment, once in a state before forming the crowned portion 4 (FIG. 7(*a*)) and once in a state after forming the crowned portion 4 (FIG. 7(*b*)). The deforming tool 12 according to the third embodiment is a modification of the deforming tool 12 according to the second embodiment. Explanations about identical parts, such as the metal tube 2, the actuator, the shafts 16 and the outer forming tool 38 are, therefore, omitted. The deforming tool 12 of the third embodiment comprises a slotted expanding mandrel 40 and two tapered expanding bolts 42 as the deforming portion. The tapered expanding bolts 42 are formed or arranged at the front ends of the shafts 16. When the shafts 16 and the expanding bolts 42 are displaced toward each other by the actuator, the outer surface of the expanding bolts 42 come into contact with a tapered inner surface of the expanding mandrel 40 to expand the expanding mandrel 40 radially outwardly so as to form the crowned portion 4. The axial length of the expanding mandrel 40 substantially corresponds to the axial length of the crowned portion 4 to be formed.

Figure 8A:
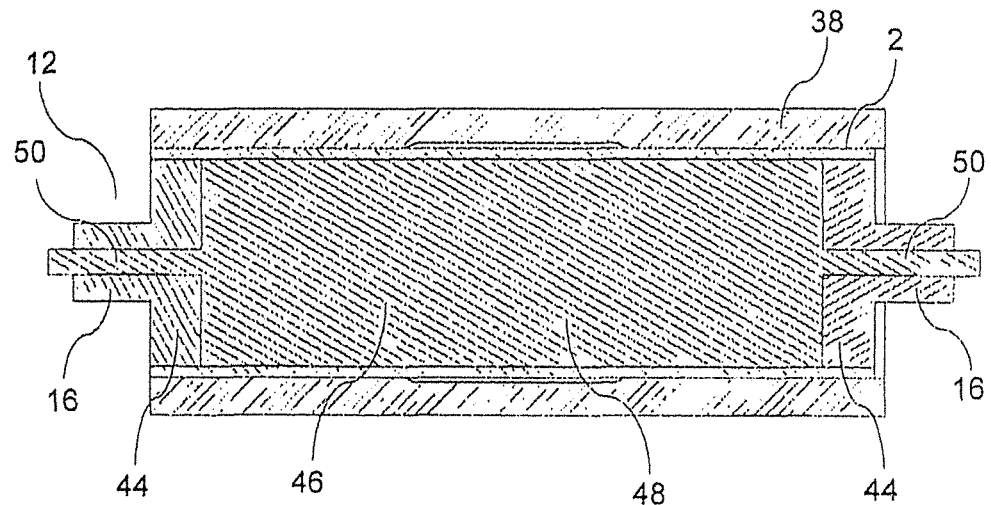
FIGS. 8(a) and 8(b) shows cross-sectional view of a deforming tool according to a fourth embodiment during use.
Figure 8B:
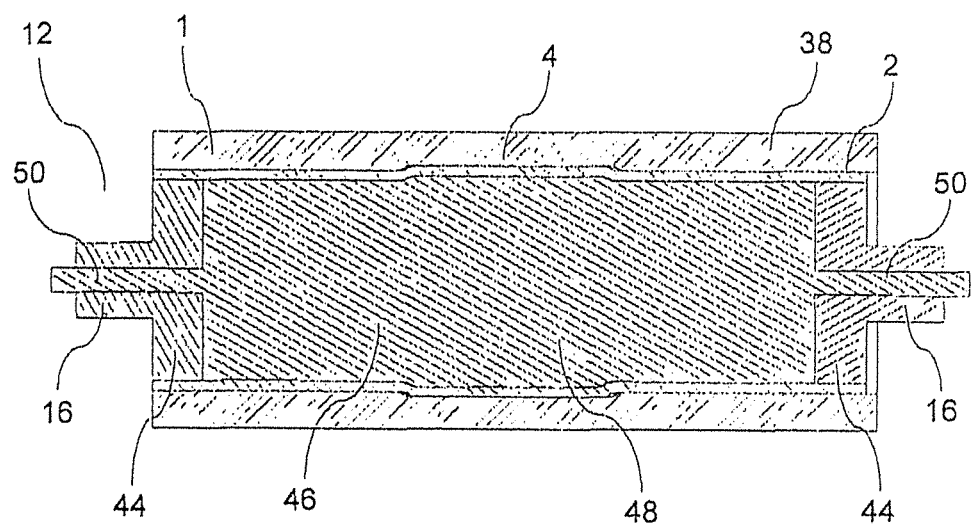

FIGS. 8(*a*) and 8(*b*) show cross-sectional views of a deforming tool 12 according to a fourth embodiment, once in a state before forming the crowned portion 4 (FIG. 8(*a*)) and once in a state after forming the crowned portion 4 (FIG. 8(*b*)). The deforming tool 12 according to the fourth embodiment is also a modification of the deforming tool 12 according to the second embodiment. Explanations about identical parts, such as the metal tube 2, the actuator, the shafts 16 and the outer forming tool 38 are, therefore, omitted. The deforming tool 12 of the fourth embodiment comprises two sealing plates 44 defining a fluid-tight space 46 within the metal tube 2, and the space 46 is filled with an expanding fluid 48 such as water or oil, as the deforming portion. The sealing plates 44 are formed or arranged at the front ends of the shafts 16. A fluid-channel 50 extends through the shafts 16 and the sealing plates 44, so that the fluid-tight space 46 can be filled with the expanding fluid 48 through the fluid-channel 50. When the shafts 16 and the sealing plates 44 are displaced toward each other by the actuator, pressure is built up in the expanding fluid 48 so that the expanding fluid 48 expands radially out at the center portion of the metal tube 2 where a radially outward deformation of the metal tube 2 is permitted by the outer forming tool 38, so as to form the crowned portion 4. A splitted outer forming tool 38 comprising two or more parts can be provided for easy withdrawal of the metal tube 2 with the crowned portion 4.

LIST OF REFERENCE SIGNS

1 roller tube
2 metal tube
4 crowned portion
6 remaining portion
8 cylindrical portion
10 tapered portion
12 deforming tool
14 actuator
16 shaft
18 deforming portion
20 arm
22 slot
24 roll
26 actuating rod
30 front end
32 displacing roll
34 pressing plate
36 rubber block
38 outer forming tool
40 expanding mandrel
42 expanding bolt
44 sealing plate
46 fluid-tight space
48 expanding fluid
50 fluid-channel
$OD_{ENL}$ enlarged outer diameter
$OD_{ORIG}$ original outer diameter

The invention claimed is:

1. A conveyor pulley for use in a belt conveyor, comprising:
a roller tube (1) having opposite first and second longitudinal ends, first and second substantially cylindrical metal tube portions (6) adjacent the respective first and second longitudinal ends, each of the first and second substantially cylindrical metal tube portions (6) having an outer diameter ($OD_{ORIG}$), the roller tube (11) further having a plastically deformed crowned portion (4) between the first and second substantially cylindrical metal tube portions (6), the crowned portion (4) having an enlarged outer diameter ($OD_{ENL}$) that is greater than the outer diameter ($OD_{ORIG}$) of the first and second substantially cylindrical metal tube portions (6), wherein the crowned portion (4) has material thickness (t) that is substantially equal to a material thickness (t) of the first and second substantially cylindrical metal tube portions (6).

2. The conveyor pulley of claim 1, wherein the outer diameter ($OD_{ENL}$) of the crowned portion (4) is about 0.5% to about 3% larger than the outer diameter ($OD_{ORIG}$) of the first and second substantially cylindrical metal tube portions (6).

3. The conveyor pulley of claim 1, wherein the crowned portion (4) is substantially cylindrical and wherein first and second tapered portions (10) or first and second stepped portions are formed between the crowned portion (4) and the respective first and second substantially cylindrical metal tube portions (6).

4. The conveyor pulley of claim 1, further comprising mounting structures for mounting the conveyor pulley to a frame of the belt conveyor.

\* \* \* \* \*